United States Patent [19]

Godwin et al.

[11] Patent Number: 4,620,069

[45] Date of Patent: Oct. 28, 1986

[54] METHOD AND APPARATUS TO DETERMINE WHETHER A SUBSCRIBER LINE IS LOADED OR NON-LOADED

[75] Inventors: William R. Godwin, Clemmons; Salvatore Quattrocchi, Raleigh, both of N.C.

[73] Assignee: ITT Corporation, New York, N.Y.

[21] Appl. No.: 677,438

[22] Filed: Dec. 3, 1984

[51] Int. Cl.$^4$ .............................................. H04B 3/46
[52] U.S. Cl. ....................... 179/175.3 R; 179/175.3 F
[58] Field of Search .................. 179/175.3 R, 175.3 F, 179/16 F; 324/57 R, 57 SS, 58 B; 364/482; 371/20, 22

[56] References Cited

U.S. PATENT DOCUMENTS

4,331,843 5/1982 Tarr et al. ................. 179/175.3 R X
4,486,627 12/1984 Beeman et al. ............... 179/175.3 R

Primary Examiner—Stafford D. Schreyer
Attorney, Agent, or Firm—John T. O'Halloran; Jeffrey P. Morris

[57] ABSTRACT

The method and apparatus to determine if a telephone subscriber line is loaded or non-loaded including circuitry to provide a signal having at least one given frequency which is coupled to a telephone subscriber line under test having a subscriber subset on-hook either directly or through the switching system such that this signal can be received from the subscriber line under test and analyzed to determine the value of at least one parameter of the subscriber line under test to determine whether the subscriber line under test is loaded or non-loaded. When the signal applied to the line has one frequency, the parameter involved is the real part of the on-hook impedance of the subscriber line under test and where a plurality of frequencies are employed, the parameter involved is either the change in the real part of the on-hook impedance of the subscriber line or a change in the phase angle of the on hook impedance of the subscriber line.

24 Claims, 12 Drawing Figures

$A = COS(W_0 \Delta t)$
$B = SIN(W_0 \Delta t)$
$W_0 = $ FREQUENCY OF INTEREST
$\Delta t = 125 \mu SEC.$

METHOD AND APPARATUS TO DETERMINE WHETHER A SUBSCRIBER LINE IS LOADED OR NON-LOADED

BACKGROUND OF THE INVENTION

The present invention relates to telephone digital switching systems and more particularly to a method and apparatus to determine whether a telephone subscriber line is loaded or non-loaded to enable automatic selection of the proper balance network for a two wire telephone loop or line in a digital switching system.

When operating a digital switching system it is necessary to select the proper balance network for the two-wire telephone loop to the subscriber. The most appropriate balance network must be selected to ensure proper operation of the system. Within the ITT 1210 digital switch these balance networks include the loaded network (1420 ohms in parallel with the build-out capacitor) a non-loaded network (690 ohms in parallel with a 0.056 microfarad capacitor) and the compromise network (900 ohms in series with a 2.14 microfarad capacitor). Currently, a digital switching system requires the customer to manually set the balance network which is located on the line printed circuit cards to the appropriate position for each loop. This entails a significant administration problem not only for the initial installation but also when any of the quad line cards are replaced.

SUMMARY OF THE INVENTION

An object of the present invention is to provide method and apparatus to determine whether a telephone subscriber line is loaded or non-loaded so as to enable automatic selection of the proper balance network.

Another object of the present invention is the provision of both a method and apparatus to determine whether a telephone subscriber line is loaded or non-loaded so that the balance network selection can be accomplished without mechanical balance network switches and their associated printed circuit wiring on the printed board assembly. This allows for a less complicated printed board assembly lay out for the quad line cards as well as for proposed octal line cards.

Still another object under present invention is to provide a method and apparatus to determine whether a telephone subscriber line is loaded or non-loaded so as to make the automatic selection of the balancing network transparent to the subscriber. This is accomplished by making the determination of loaded or non-loaded lines while the subscriber subset is on-hook, or while the subscriber subset is off-hook but in a way that will introduce no interference with the service or quality.

A feature of the present invention is the provision of A method to determine whether a telephone subscriber line is loaded or non-loaded comprising the steps of providing a signal having at least one given frequency; coupling the signal to a telephone subscriber line under test having a subscriber subset on-hook; receiving the signal from the subscriber line under test; and analyzing the received signal to determine the value of at least one parameter of the subscriber line under test to determine whether the subscriber line under test is loaded or non-loaded.

Another feature of the present invention is the provision of apparatus to determine whether a telephone subscriber line is loaded or non-loaded comprising: first means to provide a signal having at least one given frequency; second means coupled to the first means to couple the signal to a telephone subscriber line under test having a subscriber subset on-hook; third means coupled to said subscriber line under test to receive the signal returned from the subscriber line under test; and fourth means coupled to the third means to analyze the received signal to determine the value of at least one parameter of the subscriber line under test to determine whether the subscriber line under test is loaded or non-loaded.

BRIEF DESCRIPTION OF THE DRAWING

The above-mentioned and other objects and features of the present invention and the manner of obtaining them will become more apparent by reference to the following description taken in conjunction with the drawing in which.

DESCRIPTION OF THE PREFERRED EMBODIMENTS

A subscriber loop or 2-wire line can be classified into two categories, loaded and non-loaded. There are many design rules and guidelines for the subscriber loop, but in general, the ones used for loaded (H88) and non-loaded loops are as follows:

(a) Loops longer than 18 kilofeet should be loaded
(b) Loaded loops should have a 3000 foot central office end section
(c) Loaded coils should be spaced 6000 feet apart
(d) The subscriber end section of a loaded loop should be no shorter than 3,000 feet or no longer than 9,000 feet (e) The total length of all bridged taps should not exceed 12 kilofeet. Both loaded and non-loaded loops are typically composed of several section of various gauge wires. One half of the loops are coarser than 24 gauge, but less than 1% remains as open-wire arial lines. All of these physical variations in the subscriber loop cause the electrical characteristics to be equally non-standard.

The primary function of the subscriber loop is to provide the electrical connection between the subscriber and the office. The goal is to provide this connection with as small a signal loss as practical. Loading has been used on longer loops to reduce the transmission loss and provide a flatter frequency response. However, engineering a subscriber loop to maximize transmission performance can and does effect another important electrical characteristic, namely, its impedance as seen from the central office.

The impedance of the subscriber loop is an important parameter from the network point of view. This is true because the four-wire return loss of a line circuit is a function of the degree of mismatch between the loop impedance and the balance network impedance. The goal is to balance the loop properly to maximize the four-wire return loss. The stability of the four-wire circuit formed when two subscribers are connected is directly related to this four-wire return loss.

The two most important secondary parameters of a transmission line are characteristic impedance, Zo, and its propagation constant, $\gamma$. The four primary parameters are resistance (R), inductance (L), conductance (G), and mutual capacitance (C). These primary parameters are not constants but are function of gauge, frequency, and environmental parameters. However, for this investigation, these parimary parameters were considered constants with the exception of resistance and capacitance, which were allowed to change for the various gauges.

The most important parameter is the input impedance. It is a function of the secondary parameters Zo and $\gamma$ as well as the terminating impedance Z1. The following formulas were used to calculate the various parameters:

$$\text{Input impedance} = Z_{in} = Z_{inSC} \frac{Z_L + Z_{inSC}}{Z_{inOC} + Z_L} \quad (1)$$

where:

$$Z_{inSC} = Z_o \tanh \gamma l \quad (2)$$

$$Z_{inOC} = Z_o \frac{1}{\tanh \gamma l} \quad (3)$$

$$\gamma = \sqrt{(R + j\omega L)(G + j\omega C)} \quad (4)$$

$$Z_o = \sqrt{\frac{R + j\omega L}{G + j\omega C}} \quad (5)$$

$Z_{in}$ = input impedance with load $Z_L$.
$Z_{inSC}$ = input impedance for short-circuit load.
$Z_{inOC}$ = input impedance for open-circuit load.
$Z_L$ = load impedance
l = length of transmission line.
w = frequency in radians/second
$j = \sqrt{-1}$
R = resistance per unit length
L = inductance per unit length
G = conductance per unit length
C = capacitance per unit length A survey has been made which provides sufficient information about the physical makeup of subscriber loops to allow modeling of subscriber loops on a computer. This information consisted of the length and gauge of each cable section as well as the location of each load coil and bridged tap.

Using the above formulas (1) to (5), the physical information was used to calculate the electrical characteristics for each loop section. This was used with an electrical model of a telephone, both on-hook and off-hook, to calculate the loop on-hook and off-hook input impedances, respectively. The assumptions used in this analysis were that the loops consisted only of the following:

(a) Two-wire conductor sections either 26, 24, 22 or 19 gauge twisted pair, or open wire (b) H88 load coils (loaded lines only)

(c) Bridged taps (d) One on-hook telephone terminating each bridged tap (e) One on-hook or off-hook telephone terminating the end of line section (at the location defined by the physical description) for the on-hook or off-hook measurements, respectively.

None of the loops contained bridge lifters or any electronic treatment. The assumed constants for the values R, L, G, and C for each cable type and R and L values for the H88 load coils are shown in Table I.

TABLE I

| | Cable and Load Coil Constants | | | |
|---|---|---|---|---|
| Gauge | R (Ohms)* | L (mH)* | G (umhos)* | C (uf)* |
| 19 | 85.0 | 1.0 | 1.0 | .084 |
| 22 | 171.0 | 1.0 | 1.0 | .082 |
| 24 | 274.0 | 1.0 | 1.0 | .084 |
| 26 | 444.0 | 1.0 | 1.0 | .079 |
| Open | 10.0 | 3.7 | 0.3 | .0084 |

*Per mile

H88 load coil is 8.5 ohms in series with 88 mH (milihenry).

Two techniques were used to analyze the loop models. Computer modeling and graphic coanalysis. Most of the analysis of the loop models was performed with a computer using formulas (1) to (5) hereinabove. The programs were written in FORTRAN for use on the in-house PDP-11/70 computer to calculate the input impedance of the loop contained in the above mentioned survey. The programs were used to calculate both the on-hook and off-hook input impedance values. In addition, the programs used the off-hook impedance values to calculate the four-wire return loss using the following equation (6).

$$RL(\text{dB}) = 20 \log_{10} \frac{|(Z_L + Z_F)(Z_B + Z_F)|}{|2Z_F(Z_L - Z_B)|} \quad (6)$$

where
$Z_L$ = Line Impedance
$Z_B$ = Balance Network Impedance
$Z_F$ = 2-wire Hybrid Impedance.

The impedance and return loss values were calculated over the frequency range of 200–3400 Hz(hertz). These values were used in subsequent investigations of the various techniques to segregate loaded and non-loaded loops.

In addition to the analysis of the above mentioned surveyed loops, several test loops were generated and analyzed. These were typically simple loops generated in an interactive manner by the computer to investigate how changing physical parameters effected the input impedance. These loops were also used to determine how mis-engineered loaded loops could be made to appear non-loaded and vice-versa.

In the investigation of the mis-engineered loops, it was very difficult to predict how the input impedance would change with varying physical and load parameter. A graphical approach was developed, similar to the Smith Chart.

As stated earlier, the purpose of this disclosure is to identify and define a reliable means of determining whether or not a loop is loaded. In addition, this means should not disturb the subscriber or interfere in their service. The on-hook impedance of the subscriber loop, as the result of the analysis, is the most appropriate characteristic to exploit.

Two factors relating to on-hook input impedance are considered. One factor is the real part of the impedance at a single frequency. Analysis of the above mentioned survey showed that the frequency that gave the best separation was 3200 Hz. For the non-loaded loops, the real part of the on-hook impedance at 3200 was typically less than 410 ohms. The value for the loaded loops was typically greater than 630 ohms. The other factor to be considered was the four-wire return loss of the loops when terminated with a test hybrid having an output impedance of 1200 ohms resistive and a balance network resistance of 2000 ohms. Return loss at 3200 Hz for non-loaded loops was typically less than 2.6 dB (decibel) and for the loaded loops was typically greater than 3.8 dB.

Both factors, real part of the impedance and return loss, could be used to segregate loaded and non-loaded loops. The input impedance, (not the return loss) was investigated for further refinment in the technique for segregation.

There are many factors of the on-hook loop input impedance that could be considered but they can generally be classified in two categories. The first category includes those factors relating to signal-frequency measurements such as the real part, imaginary part magnitude and phase angle of the impedance. The second category includes those factors relating to multiple frequency measurements such as the change in the real part, imaginary part, magnitude and phase angle of the impedance.

In the first category of single-frequency measurements, only the real part of the impedance provided a segregation of loaded and non-loaded loops.

Considering this further, it would seem at first to be desirable to find a value of the real part of the impedance (for example, 500 ohm) that could be used to totally segregate the loops. However, as shown in Table II, hereinbelow, there is one loaded loop with 149.62 ohms that overlaps into the non-loaded range. This loop was poorly engineered, and is better balanced with non-loaded network. Using the real part of the impedance to segregate loops, the best balanced network would be chosen even when the loop was improperly classified. This is not to say that this method of segregation always provides the best balanced network to minimize return loss. Properly loaded loops with real parts of the impedance at 3200 Hz were modeled as low 443.4 ohms and non-loaded loops as high as 525 ohms. This shows that there is a high probability that there are more overlapping loops in the field than indicated in the above mentioned survey. Some of these may be classified incorrectly and be balanced with other than the optimum network.

TABLE II

| | | Worst Line Measurements | | | |
|---|---|---|---|---|---|
| | Line # | RL ($Z_L$) @ 3200 Hz Ohms | RL min. COMPROMISE dB | RL min. LOADED dB | RL min. NON-LOADED dB |
| 10 | 362 | 374.52 | 6.88 | 3.78 | 9.12 |
| Worst | 578 | 375.30 | 7.05 | 3.87 | 10.22 |
| Non- | 181 | 390.91 | 6.51 | 3.71 | 6.10 |
| Loaded | 309 | 393.75 | 7.07 | 3.90 | 8.06 |
| Loops | 332 | 394.86 | 6.86 | 3.87 | 7.23 |
| | 407 | 397.19 | 6.65 | 3.80 | 6.61 |
| | 536 | 400.43 | 7.21 | 4.02 | 7.19 |
| | 330 | 406.07 | 6.99 | 3.98 | 3.04 |
| | 338 | 408.86 | 7.24 | 4.09 | 7.51 |
| | 605 | 408.97 | 6.91 | 3.99 | 7.37 |
| 10 | 61 | 149.62 | 2.80 | 1.57 | 6.02 |
| Worst | 50 | 449.51 | 4.55 | 4.83 | 3.25 |
| Loaded | 304 | 634.68 | 2.35 | 3.71 | 1.70 |
| Loops | 208 | 655.15 | 1.59 | 4.21 | −1.00 |
| | 92 | 696.22 | 3.97 | 7.77 | 0.03 |
| | 35 | 727.22 | 2.02 | 4.89 | −1.28 |
| | 59 | 737.47 | 3.03 | 6.35 | −0.32 |
| | 266 | 783.02 | 4.96 | 4.99 | 3.55 |
| | 164 | 787.90 | 1.53 | 4.24 | −1.21 |
| | 158 | 794.31 | 2.01 | 4.90 | −1.01 |

In the second category of multiple frequency measurements, only changes in the various parameters with frequency were considered. This is opposed to considering the individual values of these parameters at several frequencies. Specifically, resonance phenomena associated with subscriber loops that contain load coils was being sought. The four parameters that were considered were changes in the real part, imaginary part, magnitude and phase angle of the on-hook impedance. As shown in Tables III through VI hereinbelow, only the change in the real part of the impedance and the phase angle provided segregation of loaded and non-loaded loops. These tables were compiled by analyzing all the loops in the above mentioned survey over the frequency range 3000 to 3400 Hz in 100 Hz increments.

Changes in the appropriate parameter for adjacent frequencies were computed and the largest of these changes for each line is shown in the Tables III–VI. Using the largest change value over the range of frequency helps eliminate classification errors due to flat spots in the frequency response of loaded loops.

TABLE III

Δ Real Part Impedance Analysis

|  | Line # | Δ Real | RL min. COMPROMISE | RL min. LOADED | RL min. NON-LOADED |
|---|---|---|---|---|---|
| Non-Loaded Loops | 325 | 3.49 | 6.6899 | 3.6035 | 7.8150 |
| Loaded Loops | 276 | 3.51 | 4.2324 | 1.6858 | 7.8318 |
|  | 623 | 3.63 | 5.3354 | 2.6531 | 8.1519 |
|  | 335 | 3.72 | 6.4524 | 3.4089 | 7.9761 |
|  | 116 | 4.25 | 5.4945 | 2.7063 | 7.8039 |
|  | 330 | 4.36 | 6.9892 | 3.9773 | 7.0394 |
|  | 191 | 4.85 | 6.4178 | 3.4338 | 5.0529 |
|  | 407 | 4.91 | 6.6473 | 3.8020 | 6.6103 |
|  | 181 | 5.06 | 6.5096 | 3.7062 | 6.1023 |
|  | 605 | 5.23 | 6.9125 | 3.9942 | 7.3694 |
| Loaded Loops | 61 | 30 | 2.7988 | 1.5661 | 6.0217 |
|  | 82 | 158 | 11.2336 | 6.2695 | 4.9566 |
|  | 50 | 161 | 4.5478 | 4.8326 | 3.2544 |
|  | 266 | 217 | 4.9638 | 4.9861 | 3.5521 |
|  | 294 | 418 | 4.6136 | 8.4434 | 1.1446 |
|  | 55 | 435 | 3.3100 | 5.0970 | 2.0311 |
|  | 311 | 441 | 3.5327 | 6.6335 | 0.7212 |
|  | 304 | 456 | 2.3536 | 3.7116 | 1.7042 |
|  | 73 | 517 | 3.9420 | 5.5667 | 2.8167 |
|  | 296 | 598 | 4.9926 | 9.2713 | 1.1018 |

TABLE IV

Δ Imaginary Part Impedance Analysis

|  | Line # | Δ Imag | RL min. COMPROMISE | RL min. LOADED | RL min. NON-LOADED |
|---|---|---|---|---|---|
| Non-Loaded Loops | 245 | 102 | 3.3456 | 2.7060 | 7.2401 |
|  | 405 | 111 | 3.1804 | 2.5274 | 6.9784 |
|  | 523 | 118 | 3.4382 | 2.8079 | 7.3878 |
|  | 464 | 120 | 3.5113 | 2.8852 | 7.5045 |
|  | 259 | 132 | 3.4634 | 2.8334 | 7.4278 |
|  | 628 | 145 | 3.3969 | 2.7634 | 7.3219 |
|  | 209 | 155 | 3.3085 | 2.6657 | 7.1811 |
|  | 531 | 321 | 3.2042 | 2.5546 | 7.0163 |
|  | 588 | 404 | 3.2385 | 2.5920 | 7.0705 |
|  | 618 | 1640 | 2.9802 | 2.3144 | 6.6645 |
| Loaded Loops | 61 | 116 | 2.7988 | 1.5661 | 6.0217 |
|  | 41 | 145 | 4.8784 | 9.1939 | 0.8572 |
|  | 82 | 157 | 11.2336 | 6.2695 | 4.9566 |
|  | 266 | 189 | 4.9638 | 4.9861 | 3.5521 |
|  | 252 | 244 | 1.7425 | 3.6405 | 0.2027 |
|  | 270 | 280 | 1.7599 | 3.6584 | 0.2357 |
|  | 304 | 358 | 2.3536 | 3.7116 | 1.7042 |
|  | 50 | 369 | 4.5478 | 4.8326 | 3.2544 |
|  | 218 | 446 | 4.5347 | 8.6473 | 0.6281 |
|  | 318 | 449 | 4.8009 | 8.9467 | 1.0096 |

TABLE V

Phase Analysis

|  | Line # | Δ Phase | RL min. COMPROMISE | RL min. LOADED | RL min. NON-LOADED |
|---|---|---|---|---|---|
| Non-Loaded Loops | 364 | 0.866 | 4.0489 | 1.6068 | 12.2710 |
|  | 230 | 0.871 | 4.4208 | 1.9144 | 13.5369 |
|  | 274 | 0.877 | 4.0549 | 1.6134 | 12.3110 |
|  | 177 | 0.884 | 4.3853 | 1.8335 | 12.6954 |
|  | 613 | 0.893 | 3.9932 | 1.5105 | 11.4153 |
|  | 179 | 0.898 | 3.8730 | 1.4510 | 11.5858 |
|  | 120 | 0.898 | 5.0409 | 2.5441 | 13.9759 |
|  | 496 | 0.928 | 3.6690 | 1.2264 | 10.1815 |
|  | 443 | 0.950 | 4.0270 | 1.4801 | 10.5738 |
|  | 379 | 0.956 | 3.8669 | 1.4049 | 11.0051 |
| Loaded Loops | 41 | 2.92 | 4.2784 | 9.1939 | 0.8572 |
|  | 82 | 5.74 | 11.2336 | 6.2695 | 4.9566 |
|  | 195 | 5.81 | 3.5543 | 7.0525 | 0.1985 |
|  | 34 | 6.76 | 3.7023 | 6.4019 | 1.3493 |
|  | 61 | 7.42 | 2.7988 | 1.5661 | 6.0217 |
|  | 266 | 7.96 | 4.9638 | 4.9861 | 3.5521 |
|  | 170 | 8.34 | 4.5573 | 8.6414 | 0.7341 |
|  | 325 | 8.46 | 2.3659 | 5.2064 | −1.2684 |
|  | 252 | 9.23 | 1.7425 | 3.6405 | 0.2027 |
|  | 294 | 9.27 | 4.6136 | 8.4434 | 1.1446 |

TABLE VI

Δ Magnitude Analysis

|  | Line # | Δ Mag | RL min. COMPROMISE | RL min. LOADED | RL min. NON-LOADED |
|---|---|---|---|---|---|
| Non-Loaded Loops | 246 | 102 | 3.3456 | 2.7060 | 7.2401 |
|  | 405 | 111 | 3.1804 | 2.5274 | 6.9784 |
|  | 523 | 119 | 3.4382 | 2.8079 | 7.3878 |
|  | 464 | 120 | 3.5113 | 2.8852 | 7.5045 |
|  | 259 | 132 | 3.4634 | 2.8334 | 7.4278 |
|  | 628 | 145 | 3.3969 | 2.7634 | 7.3219 |
|  | 209 | 155 | 3.3085 | 2.6657 | 7.1811 |
|  | 531 | 322 | 3.2042 | 2.5546 | 7.0163 |
|  | 588 | 404 | 3.2385 | 2.5920 | 7.0705 |
|  | 618 | 1640 | 2.9802 | 2.3144 | 6.6645 |
| Loaded Loops | 61 | 118 | 2.7988 | 1.5661 | 6.0217 |
|  | 266 | 159 | 4.9638 | 4.9861 | 3.5521 |
|  | 82 | 169 | 11.2336 | 6.2695 | 4.9566 |
|  | 50 | 267 | 4.5478 | 4.8326 | 3.2544 |
|  | 73 | 437 | 3.9420 | 5.5667 | 2.8167 |
|  | 304 | 473 | 2.3536 | 3.7116 | 1.7042 |
|  | 294 | 493 | 4.6136 | 8.4434 | 1.1446 |
|  | 252 | 506 | 1.7425 | 3.6405 | 0.2027 |
|  | 296 | 507 | 4.9926 | 9.2713 | 1.1018 |
|  | 55 | 564 | 3.3100 | 5.0970 | 2.0311 |

Techniques for measuring the change in the real part and phase angle of the impedance over frequency are obviously more complex. More measurements as well as a more complex computational algorithm are required. It is, however, easier to explain why they work. They directly exploit the band edge resonance effects of loops with load coils. Thus, if a load coil is present, it can be detected and a loop could then be balanced with a loaded loop balance network; otherwise, the loop is considered non-loaded and balanced accordingly.

However, this can result in loops such as loop #61 in Table II being improperly balanced for performance purposes.

For the change in the real part of the impedance (delta real), Table III. shows that a good decision value might be in the order of 100 ohms. Any loop measuring less than this value would be balanced with the non-loaded network and all others with the loaded network. An interesting point is that if 100 ohms were used on a decision value for segretation of the loaded and non-loaded loops, then loaded loop #61 would be classified as non-loaded. Thus, the non-loaded balance network would be selected, but as mentioned before, this network provides the best minimum return loss for that loop. Again, this technique may not always select the best balanced network for the poorly engineered loops, such as #61, but this occurance should be rare.

For the change in phase angle (delta phase) measurements, Table V. shows that a good decision value might be on the order of 1.5 degrees. Any loop measuring less than this value would be balanced with the non-loaded network and all others would be balanced with the loaded network.

Another facet to consider in each of the three techniques is the required accuracy of the measurements. In dealing with the single frequency measurement, the accuracy issue is fairly straight forward. That is, the separation between loaded and non-loaded loops at 500 ohms is in the order of ±100 ohms or about ±20%. The required accuracy of the measured impedance for a good separation is not very tight. However, delta measurements require absolute accuracy. Even small percentage errors in two large measured values can result in gross errors in their differences. For example, for delta measurements, errors in the measured impedance values as small as ±2% can result in delta phase angle errors as large as 2.3 degrees.

As stated previously, three techniques or methods of measurement provide good segregation of the loaded and non-loaded loops. These were related to the real part of the impedance at 3200 hz, the maximum change in the real part and the maximum change in the phase angle, with the latter two evaluated over the frequency range 3000 to 3400 hz in 100-hz increments. None of the techniques have been selected as being the best: each has its advantages and disadvantages. It is very possible that two or all three could be used in a weighted-algorithm to make the proper selection.

In evaluating the technique of measuring the real part of the impedance at a single frequency, there are several points to consider. It is a simple measurement at a single frequency, and there is little computation required after the measurement is made. The only question is what limit value should be used when selecting the loaded or non-loaded balance networks. By looking at the data in Table II., one criteria might be to classify as loaded all loops above 500 ohms and all others as non-loaded and then to balance them with the appropriate network. Another criteria might use two limits; balance all loops less than 400 ohms with the non-loaded network and for those greater than 600 ohms use the loaded network. For loops between 400 and 600 ohms, use the compromise network. Based upon the above mentioned survey, either of these segretation/selection criteria would give good results.

Although the technique for using the real parts of the impedence seem to work well, it is difficult to provide a good theoretical reason for why it does. Band edge effects that cause wild changes in the impedance of loaded loops is the probable cause for the segretation to be performed so well.

When using values of the real part of loaded loops of 4000 ohms, the ±2% measured errors can cause delta real errors as large as 160 ohms. Errors of these magnitudes can easily cause an improper balance network to be selected.

One method to compensate for the accuracy problem associated with the delta techniques would be to extend their frequency measurement range. This would widen the separation of the values for the loaded and non-loaded loops. The problem with this is that it increases the complexity of and time required to perform the tests.

Each of the techniques described hereinabove deals with the measured on-hook impedance of the subscriber loop. There are many ways in which this parameter might be measured, two of which are described herein.

One method is a straight forward approach where an impedance-measurement instrument is connected directly to the subscriber tip-ring lines through the test bus. The other method uses the line circuit normally connected to the subscriber loop in question along with some signal processing techniques to measure the impedance.

In either case, there is a need for more than just measuring impedance. Also needed is some means to communicate commands and results with the digital switching controller.

The measuring system could be as simple as a device to measure impedance and report this value to the digital switching controller or as complex as one that performs all measurements, evaluates this data with the appropriate selection algorithms and reports which balance network should be used.

The most direct approach to measuring the impedance of the subscriber line would be to connect a measuring instrument to the tip-ring conductors of the subscriber loop through the test bus. This measuring instrument could be either a purchase device or of in-house design.

The advantage of a test bus approach is that it provides direct metallic access to the tip-ring conductors. Therefore, the accuracy to which the measurements are to be made is limited only to the accuracy of the measuring instrument. A disadvantage is that it requires the undivided use of the test bus while the measurements are being performed. This, however, will not prove to be a major problem if the measurements are not performed often or if the test bus is generally available. This technique will be described herein below with reference to FIGS. 8, 9 and 10.

Figure 1:
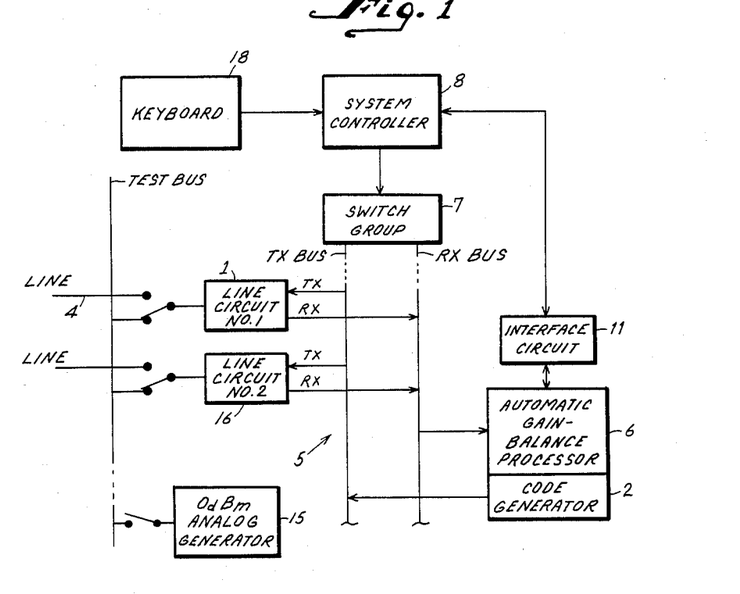
FIG. 1 is a block diagram illustrating a telephone digital switching system incorporating the apparatus enabling the determination of whether a telephone subscriber line is loaded or non-loaded in accordance with the principles of the present invention.
Figure 2:
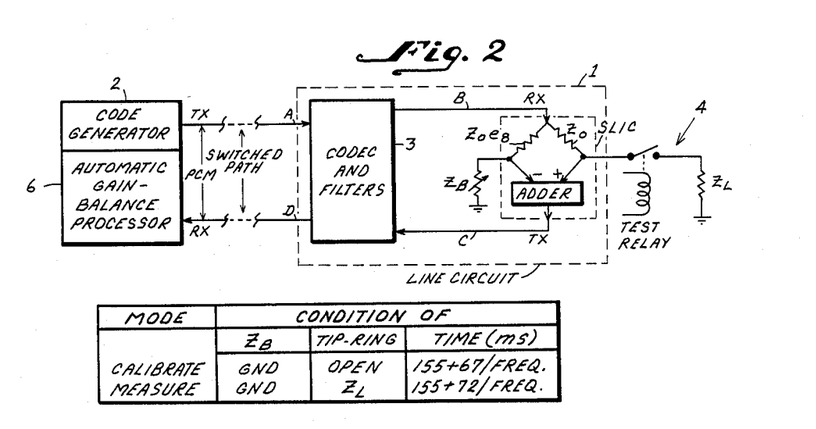
FIG. 2 is a block diagram of a more detailed illustration of the apparatus in accordance with the principles of the present invention incorporated into a digital switch system.

As mentioned previously, the impedance measurements could be performed by using the line circuit normally connected to the subscriber loop being tested. This technique is illustrated in FIGS. 1 and 2. To understand how this is done, consider the following. FIGS. 1 and 2 show a line circuit 1 with several signals A, B, C and D identified in FIG. 2. Signals A and D are digital and signals B and C are analog. Consider the exciter signal A to be a digital representation of a sinewave as produced in code generator 2. The other signals B, C and D will be sinusoids as well, either analog versions or digital representations thereof. Even though the signal path from A back to D changes from digital to analog and back to digital, the signals can be thought of as phasors with the circuits involved as performing transfer functions on them. That is, signal B after passing through the digital to analog converter of the codec and filter 3 of line circuit 1 can be considered to be the result of signal A and the transfer function from A to B $TF_{ab}$. Signal C is the result of signal B and the transfer function from B to C is $TF_{bc}$. Signal D is a result of signal C after passing through the analog to digital converter of codec and filter 3 of line circuit 1 and the transfer function from C to D $TF_{cd}$. Thus, signal D can be considered to be a signal modified by $TF_{ab}, TF_{bc}$ and $TF_{cd}$ or:

$$D = A(TF_{ab})(TF_{bc})(TF_{cd}), \text{ or} \qquad (7)$$

$$TF_{ad} = \frac{D}{A} = (TF_{ab})(TF_{bc})(TF_{cd})$$

It can be shown that $TF_{bc}$, which represents the transhybid transfer function, has the form:

$$TF_{bc} = \frac{C}{D} = \frac{2Z_F(Z_L - Z_B)}{(Z_L + Z_F)(Z_B + Z_F)}$$

where $Z_F$, $Z_L$, and $Z_B$ are as defined hereinabove. If $Z_B$ is set to 0, this reduces to $$TF_{bc} = \frac{2Z_L}{Z_L + Z_F}$$

This can be substituted back into Equation 7.

$$TF_{ad} = (TF_{ab})(TF_{cd}) \frac{2Z_L}{Z_L + Z_F} \qquad (8)$$

Solving Equation 8 for $Z_L$, $$Z_L = Z_F \frac{TF_{ad}}{2TF_{ab}TF_{cd} - TF_{ad}} \qquad (9)$$

Now, consider Equation 8 where $Z_L >> Z_F$ such as with the tip-ring open circuited. In the limit where $Z_L$ goes to infinity, $$TF_{adoc} = (TF_{ab})(TF_{cd})2 \qquad (10)$$

Substituting this back into Equation 9, $$Z_L = Z_F \frac{TF_{ad}}{TF_{adoc} - TF_{ad}} \qquad (11)$$

where:
$Z_F$=Hybrid (SLIC) output impedance.
$TF_{ad}$=Measured ratio of phasors D/A with the tip-ring connected to $Z_L$.
$TF_{adoc}$=Measured ratio of phasors D/A with the tip-ring open circuited.
$Z_L$=Unknown loop impedance.

Now by using equation 11, the impedance can be calculated by performing two measurements. First, measure open-circuit transfer function $TF_{adoc}$ where the tip-ring is open. This calabration measurement could be accomplished by connecting line circuit 1 to the test bus in an unterminated manner as shown in FIG. 1. After this calibration measurement, the line circuit 1 is then returned back to its subscriber loop or line. Another measurement is then performed to obtain transfer function $TF_{ad}$. During both measurements, exciter signal A from code generator 2 is a digitally generated sinusoid at the desired frequency ωa.

The above technique can be used to solve for the unknown impedance $Z_L$ shown in FIG. 2 only when the factors in Equation 11 are treated as complex numbers or phasors and both ratio measurements, $TF_{ad}$ and $TF_{adoc}$, are performed with $Z_B$ shown in FIG. 2 equal to 0 or grounded.

Relating to the question of how ratios $TF_{adoc}$ $TF_{ad}$ could be measured, consider the following. Sinusoidal signal A is one that is easily generated digitally and, as such, can be completely defined as to amplitude and phase. For purposes here, consider signal A to have unity amplitude and zero phase shift. All that is necessary to analyze the ratio signal D to signal A is to analyze signal D. This can easily be done using Fourier Transform techniques specifically the Digital Fourier Transform (DFT). This requires sampling signal D, starting with some fixed phase relationship to signal A, and then performing the DFT algorithm on these samples. The magnitude and phase of the DFT components at the original signal frequency, ωa, will then be equivalent to the value of transfer function $TF_{ad}$ (or $TF_{adoc}$) at frequency ωa. Evaluating the values $TF_{ad}$ and $TF_{adoc}$ and using these in Equation 11, the value of $Z_L$ at frequency ωa can be calculated.

This process could be repeated, as necessary, for all frequency components of $Z_L$. However, a useful aspect of this technique is that the DFT has the ability to separate the frequency components in signal D. Thus, signal A need not be restricted to a single sinusoid. It can be the sum of several sinusoids at the various frequencies of interest. Therefore, to measure $TF_{ad}$ and $TF_{adoc}$ at several frequencies, all that is necessary is to expose the line circuit 1 and the loop or subscriber line 4 to the signal A containing all the frequency components of interest. The samples of signal D can then be analyzed off-line with the DFT to obtain the several components of the transfer functions at each frequency. This would be done once to measure $TF_{ad}$ and once again to measure $TF_{adoc}$. These can then be used to calculate the various values of $Z_L$ at the frequencies of interest.

After the impedance is calculated, more processing can be performed to calculate the phase angles and process them along with the real parts of the impedance to determine which balance network should be selected.

There are several advantages is using the DFT technique. First, it uses the switched data path to perform the measurements. Therefore, it places no restriction on the location of the measuring system. However, there is a requirement to control the line circuit by selecting the balance network and being able to control the test bus to perform the calibration measurement. Another advantage is that it can perform multifrequency measurements simultaneously. Therefore, the subscriber loop is out of service only for a brief time. Yet another advantage is that it can be implemented with a microprocessor which would be included in the automatic gain-balance processor 6.

One of the most serious disadvantages is that it uses the companded code to pass signal data to be analyzed. The inherent quantization error in the data adversely affects the accuracy of the calculated impedance. The only way to improve this accuracy would be to use linear data of more than eight bits per sample. Another disadvantage is that this technique also requires use of the test bus. Any other way to open-circuit the line circuit for the calibration measurement would be acceptable.

Two configurations of measuring systems used to segregate loaded and non-loaded subscriber loops were previously described. The system described employing the line circuit 1h as been built and integrated with the advanced line switch test arrangement of the ITT 1210 digital switching system. This equipment has been designated the automatic gain-balance processor 6. Processor 6 measures the on-hook impedance of a subscriber loop by testing it with data passed through the line circuit 1 for the loop being tested. This measured impedance is then analyzed to determine the most appropriate balance network.

As the name implies, the automatic gain-balance processor 6 performs three functions. It measures impedance and selects balance networks, and it measures the amplitude of a sinusoid. This measured amplitude is used in a gain-setting algorithm to set the gain of the line circuits. Both the gain and balance functions are similar in operation. Both use specialized tones to stimulate the line circuits in performing the various tests. Both receive and analyze PCM data it has passed through the line circuits.

As shown in FIGS. 1 and 2 processor 6 and generator 2 are incorporated in a data switching system of the type utilizing pulse code modulation and time division multiplexing techniques for switching voice signals. In the illustrated embodiment described herein, the System 1210 digital switching system, which is commercially available from ITT Corporation is utilized. The System 1210 utilizes three basic building blocks, i.e. line switches group switches and a system controller. Line switches 1 contain line circuits which accomplish a standard telephone interface for up to 320 lines each. Each line switch 1 contains terminations for two T1 lines coupled to switch group 7 including a microprocessor. Switch group 7 is associated with system controller 8 including a microprocessor with random access memory and read only memory. The line switch microprocessors operate independently to service the lines, format the T1 bit stream and control and monitor the functions of the line circuits 1. Any line seeking originating or terminating service can be handled by either microprocessor and can be serviced over any time slot (channel) on either T1 line.

The actual interface for the subscriber loops are the line circuit cards 1, each providing four lines. Among other functions, each line circuit 1 provides digital to analog and analog to digital conversion and ring trip control.

The switch group 7 is a, PCM switch which provides time-space-time switching of channels. Each switch group 7 contains its own microprocessor controller which is, in turn, controlled by system controller 8. Various details of the line circuits 1, switch groups 7, and system controller 8 have been described by N. J. Skaperdan in "Generic Digital Switching Systems", International Switching Symposium, Vol. 1 Oct. 19, 1976; by G. B. Svala in "DSS-1, A Digital Local Switching System With Remote Line Switches" Proceedings of the National Telecommunication Conference, page 3915-1, 1977; and by F. Fellinger "Modular Digital Switching Network", International Communications Conference, June 4-7, 1978.

Figure 3:
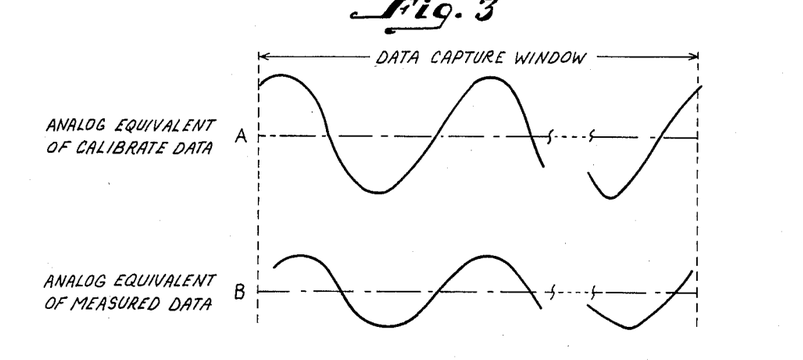
FIG. 3 is a set of waveform illustrating the mode waveforms of the arrangement of FIG. 2.

FIG. 3 illustrates therein two waveforms with the curve A illustrating the waveform for the calibrate mode listed hereinabove and waveform B illustrating the analog equivalent of the measured data. In other words, waveforms showing the result of passing through and being returned by the subscriber loop.

Figure 4:
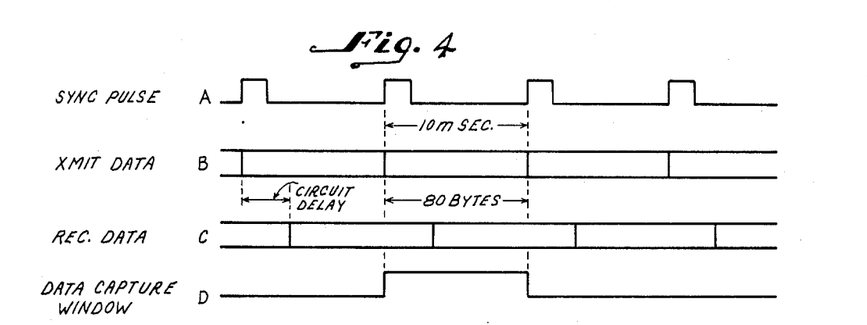
FIG. 4 is a timing diagram showing the operation of the apparatus in accordance with the principles of the prsent invention.

FIG. 4 is a timing diagram showing the operation of the code generator 2 and processor 6 which enables the measurement of the on-hook impedance of the subscriber loop.

Figure 5:
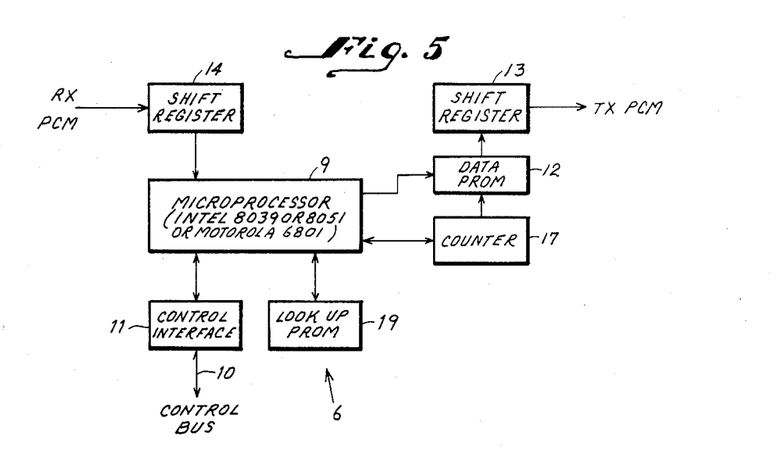
FIG. 5 is a block diagram of one embodiment of the automatic gain-balance processor of FIGS. 1 and 2.

FIG. 5 is a block diagram of the automatic-gain balance processor 6 of FIGS. 1 and 2 and includes as the basic unit thereof a microprocessor 9. The microprocessor may be an INTEL 8039 or 8051 or a MOTOROLA 6801 processor. These processors can be employed because they are single-chip processors with the INTEL 8051 and MOTOROLA 6801 proving to be more efficient because they have built-in multiply and divide instructions. To speed the processing, an external multiply/divide circuit was incorporated into the implementation of the Automatic Gain-Balance Processor 6.

Processor 6 is actuated by commands received from system controller 8 on control bus 10. Those commands are coupled to microprocessor 9 through control interface circuit 11. Special tones in digital form are provided by the data PROM 12 and when transmitted into PCM stream via shift register 13, and then switched to the appropriate line circuit one via switch group 7. PCM from the subscriber loop being tested is then switched back to the input shift register 14 of processor 6. This received data is analyzed by microprocessor 9 and the results are reported back to the switch system controller 8 via control interface circuit 11 and control bus 10 for appropriate action. The processor 6 then reverts to an idle state and awaits another command.

The gain portion of the processor 6 consists of an algorithm to measure the amplitude of a received sinusoid. In this implementation, it is limited to determining if the signal is above, below, or within a predetermined amplitude window.

The procedure used to set the gain of a circuit is as follows. First, a test sinusoid of known amplitude at 1024 Hz is passed through the circuit under test. The test sinusoid is provided by generator 15 of FIG. 1 coupled to the test bus. The resulting signal is then analyzed by the processor 6 to determine amplitude. If the test signal level is too low, the processor signals Controller 8 to increase the gain in the line circuit 1 being tested. If it is too high, the processor 6 signals the Controller 8 to lower the gain. This procedure is repeated until the measured amplitude is within the limits of the acceptance window. When this occurs, the processor 6 signals controller 8 that the gain is properly set.

The gains of the transmit and receive sides of the line circuits are set separately. FIG. 1 shows the test set-up used. First, an analog signal of 1024 Hz at 0 dBm is sent from generator 15 via the test bus, through the receive side of line circuit No. 1 to the processor 6 for analysis. After the gain of the receive side of this line circuit is set and calibrated by the above procedure, it is then used to set the transmit gain in other line circuits. The analog test signal is now removed from the test bus but line circuits 1 and 16 are connected together. A digital signal of 1024 Hz at +0.25 dBm, as generated by processor 6 and code generator 2 is sent through the transmit side of line circuit 16, through the receive side of line circuit 1 and back to the processor 6 for analysis. In this manner, the transmit gain of line circuit 16 can be set. The procedure can then be repeated to set the gain in all other circuits.

In this implementation, the limits of the acceptance window are set to −0.083 dBm and +0.035 dBm. When setting the gain of the receive side of line circuit, the amplitude of the test signal is 0 dBm; for the transmit side, it is +0.25 dBm. This results in the gain of the receive side being set in the range of from −0.083 dB to +0.035 dBm. The transmit side gain is set in the range of from −0.368 dB to −0.132 dBm. By adjusting the acceptance window and/or the test signal amplitude, the gains could be set to any other values.

Figure 6:
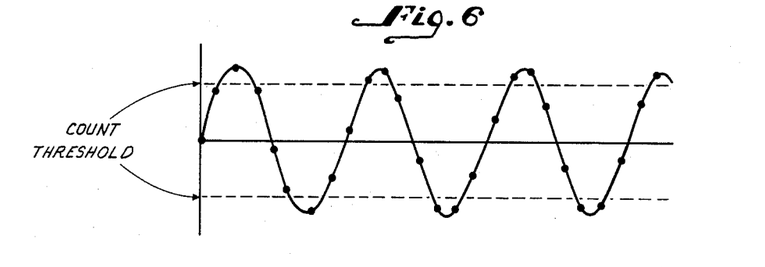
FIG. 6 is a wave-form useful in explaining the operation of the Automatic Gain-Balance Processor of FIG. 5.

The technique used by the processor 6 to measure amplitude is a counting scheme based on the sample signal levels. FIG. 6 shows several cycles of a 1024-Hz waveform with the dots representing the samples. As shown in FIG. 6, a count threshold can be established by selecting a companded value that represents a test signal level. Any occurrence of a sample that represents a value at or higher than this threshold level causes a counter, counter in microprocessor 9 of FIG. 5, to be incremented by one. The value chosen for this threshold level, along with the number of samples in a sampling interval above this level, can be used to calculate the peak amplitude of the signal. The sampling interval was chosen to be 16 cycles of the 1024-Hz test sinusoid. This corresponds to a total of 125 samples. The count threshold was chosen to be companded level 118, but since the least significant bit of the companded sample is masked to eliminate the signaling bit, this level really corresponds to levels 118 or 119. Thus, any sample whose companded value is greater than or equal to 118, which corresponds to a linear value of greater than 5599, causes the threshold count to be incremented by one. In u-Law companding, this value of 5599 represents the amplitude of a −0.101 dBm sinusoid where 8159 represents a signal level of +3.17 dBm.

The following formula can be used to calculate the amplitude of the signal being tested.

$$A' = \frac{A}{\cos\left(\frac{n}{N} \frac{\pi}{2}\right)}$$

where
A′=Linear amplitude of signal being tested.
A=5599 (linear value of count threshold).
N=125 (total number of samples).
n=Number of samples above count threshold.

The processor 6 does not calculate the value A′. It counts the number, n, of samples above the count threshold. The acceptance window for n is from 5 to 14 counts. A count of n less than 5 indicates the gain is too low. A count greater than 14 indicates the gain is too high. A count of between 5 and 14, which corresponds to an amplitude from −0.083 dBm to +0.035 dBm, indicates the gain is properly set.

The techniques for measuring the on-hook impedance of a subscriber loop or line have been described hereinabove. The following is concerned primarily with the specific implementation of the processor 6 and the DFT algorithm used by it.

All three balance selection techniques mentioned hereinabove have been implemented in processor 6. The first of these is based on the value of the real part of the impedance of the subscriber loop at a single frequency. The other two techniques are based on changes in the real part and the phase angle of the on-hook impedance, respectively, over a range of frequencies. In addition, a generator for the various frequencies and frequency ranges to be used in the tests has been implemented in processor 6. These sinusoids are stored in digital form in the data PROM 12 in FIG. 5. The various signals stored in the PROM 12 are shown in Table VII.

TABLE VII

| | Processor 6 Frequencies | |
|---|---|---|
| Frequency Code | Single Frequency (Hz) | Multiple Frequency Range (Hz) |
| 0 | — | 2500–2900 |
| 1 | — | 2600–3000 |
| 2 | — | 2700–3100 |
| 3 | — | 2800–3200 |
| 4 | — | 2900–3300 |
| 5 | — | 3000–3400 |
| 6 | 2500 | 2500–3000 |
| 7 | 2600 | 2600–3100 |
| 8 | 2700 | 2700–3200 |
| 9 | 2800 | 2800–3300 |
| 10 | 2900 | 2900–3400 |
| 11 | 3000 | — |
| 12 | 3100 | 2500–3100 |
| 13 | 3200 | 2600–3200 |
| 14 | 3300 | 2700–3300 |
| 15 | 3400 | 2800–3400 |

Any of the signal frequencies shown in Table VII can be used with the real part impedance technique. Any of the multiple frequencies can be used with the change or delta techniques. This flexibility was built into processor 6 to verify the various techniques as well as to test their effectiveness and accuracy.

Gain and balance commands are input from the keyboard 18 (FIG. 1). The command formats are shown in Tables VIII and IX.

TABLE VIII

| GAIN/BALANCE AUTO-ADJUST COMMANDS | | |
|---|---|---|
| Command | Fomat | Comments |
| Set TX Gain | /V[n]<br>↑ ↑<br>    └─ loop ≃ of loop being gain adjusted<br>└─ clears command receive buffer | []—optional parameters contained in brackets n = 0,1 |
| Set RX Gain | /W[n][,[m]]<br>↑ ↑<br>↑ └─ loop used for TX PCM data path (assumed to have TX gain previously calibrated<br>└─ loop being gain adjusted | n ≠ m, n,m = 0,1 |

TABLE VIII-continued
GAIN/BALANCE AUTO-ADJUST COMMANDS

| Command | Format | Comments |
|---------|--------|----------|
| Set BALANCE | /X[n][,[f][,a]]] | |

```
          /X[n][,[f][,a]]]
              ↑  ↑  ↑
              |  |  └─ algorithm selection (0,1,2)
              |  └──── frequency option selection (0-15)
              └─────── loop being balance adjusted (0,1)
```

| Examples: | /X0,13,0 | line 0, freq. option 13, algorithm 0 |
|-----------|----------|--------------------------------------|
|           | /X,,1    | change algorithm only                |
|           | /X,12    | change freq. option only             |

Notes:
(1) Freq. options 0-5 are invalid for algorithm 0
(2) Freq. option 11 is invalid for algorithms 1 and 2.
(3) Algorithm 0 uses $R_e [Z_L]$
Algorithm 1 uses $\Delta$ Phase $[Z_L]$
Algorithm 2 uses $\Delta R_e [Z_L]$

TABLE IX
ALS Feasibility Model Line Switch Controller Card

| | Function of Switch | |
|---|---|---|
| Bit | Up Position | Down Position |
| 0 | Suppress D & P Execution | Dog & Pony Show Software |
| 1 | 6-bit Gain Settings | 5-bit Gain Settings |
| 2 | Display all gain settings during GNADJ | Suppress intermediate gain settings |
| 3 | Display all balance measurement parameters | Suppress proprietary balance network selection parameters |

There are three command types. One is used to set the gain in the transmit side of a line circuit, another is used to set the gain in the receive side of a line circuit, and the third is used to select a balance network for a line circuit. The first two command types require as input which line(s) is to have its gain set. The balance command requires for input the number of the line circuit to be balanced, the technique or algorithm used to select the balanced network, and the frequency or frequency range to be used in the test. The three balance algorithms are numbered 0, 1, and 2 for the real part, delta phase, and delta real technique, respectively.

The commands are first received by system controller 8 (FIG. 1) where they are reformatted and transferred to processor 6 over control bus 10 and interface circuit 11. All necessary set-up is accomplished by controller 8 prior to transferring the command to processor 6. This includes such things as assigning data channels, connecting circuits to the test bus, grounding the balance network, and opening the tip-ring conductors of the line circuits as needed for the various tests. All that is required of processor 6 is to address the data PROM 12 to select the proper tone(s) used in the test, receive and analyze the data, and signal controller 8 when the results of the test is complete.

Balance network selection is accomplished by a 2-step process. First, the system controller 8 sets up the circuits for a calibration measurement. This consists of grounding the balance network input and opening the tip-ring of the line circuit being used in the test. Also, the data path for the test tones from processor 6, through the line circuit 1 and back to processor 6 is established. Controller 8 then signals processor 6 to perform the calibration measurements. Processor 6 signals controller 8 when this is complete. For the second step, controller 8 reconnects the line circuit to the line being tested, but leaves the balance network input grounded. Controller 8 then commands processor 6 to perform the impedance measurements and to select the proper balance network. When complete, this information is signaled back to controller 8, which in turn causes the selected balance network to be connected to the line circuit.

Figure 7:
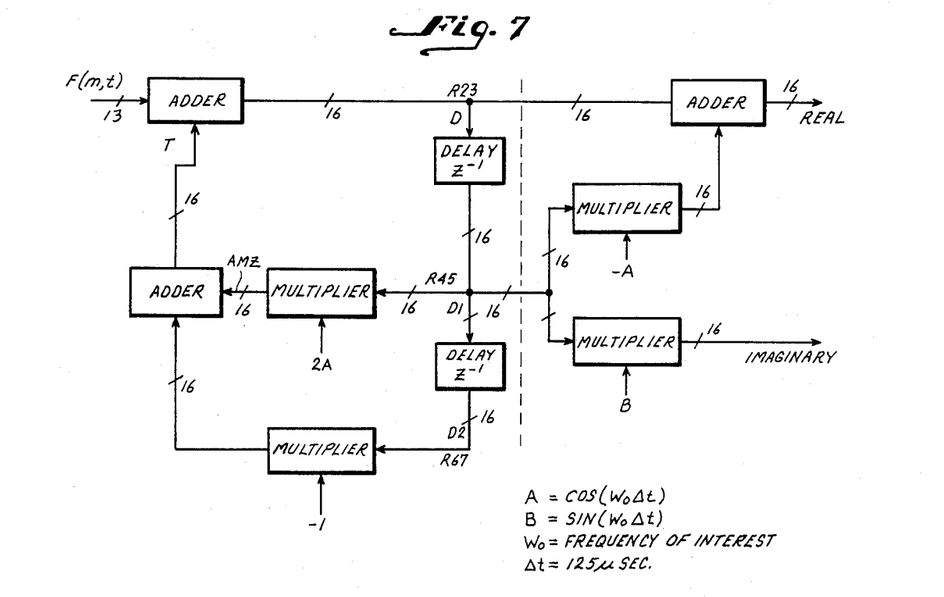
FIG. 7 is a block diagram illustrating the Goertzel Algorithm employed by the microprocessor in the embodiment of FIG. 5.

As stated previously, transfer functions $TF_{ad}$ and $TF_{adoc}$ can be measured using Fourier Transform techniques. The specific DFT algorithm used in the implementation disclosed herein is known as the Goertzel Algorithm. A diagram of this algorithm is shown in FIG. 7. This algorithm is used to analyze the received data and calculate its Fourier coefficients, which are equivalent to the values of the transfer functions. The Goertzel Algorithm is not restricted to a power of 2 for the number of data points as in some other Fast Fourier Transform techniques. This, along with the ease by which it can be implemented in a microprocessor, made it the natural choice to perform the DFT. Another good feature is that it requires no complex multiplications; all multiplications are real.

The number of signal samples or data points used in the analysis was chosen to be 80. This number was selected because all frequencies from 100 to 4000 Hz in 100-Hz intervals can be represented by 80 or fewer repeating samples when sampled at an 8-kHz rate.

During both the calibrate and the impedance measurement phases, processor 6 first captures 80 consecutive samples of the input data and stores them in the internal RAM (Random Access Memory) of the microprocessor 9. After this is completed, the data, which is in the companded format, is converted to its 13-bit linear equivalent value by using a look-up PROM 19 (FIG. 5). These value, F(m,t), are then sequentially input to the Goertzel Algorithm as illustrated in FIG. 7. As each data sample is input, all summations and multiplications are performed followed by the shifts ($Z^{-1}$). The process is repeated for each data sample until all 80 have been input. At that time, the real and imaginary outputs are valid. The operations to the left of the dotted line are performed for each input sample. However, those to the right of the dotted line need to be performed only once after all the data has been input. This reduces the computation time and complexity. The real and imaginary outputs are the real and imaginary components, respectively, of the Fourier coefficients, which are in turn equal to the transfer function being measured.

The frequency of analysis of the sampled data is determined by multiplier coefficients A and B as shown in FIG. 7. They are simply the cosine and sine functions, respectively, of the frequency of analysis, in radians, times the sampling interval. Thus, the sample data can be analyzed at several different frequencies by changing coefficients A and B and reprocessing it through the algorithm.

During the calibration phase, the real and imaginary values of transfer function $TF_{ad}$, at the various frequencies, are computed and stored in the internal RAM. During the impedance measurement phase, the values of transfer function $TF_{adoc}$ are computed. These second values are then used with the calibrate values stored in RAM with Equation 11 hereinabove to compute the value of impedance at their various frequencies.

The calculated impedance is then analyzed according to the selected balance algorithm and the appropriate network is selected. This information is signaled back to controller 8 for the appropriate action.

The speed at which a balance network can be selected is heavily weighted by the speed of the controller 8; that is, how fast controller 8 can perform the set-up functions, command processor 6 to perform the test and respond when the test is complete.

The time required for the calibration phase has been measured to be 155 ms (milliseconds) plus 67 ms per frequency. The time required for the measurement phase has been determined to be 155 ms plus 72 ms per frequency. In both phases, the basic time of 155 ms consists of 145 ms allowed for the circuits under test to stabilize followed by 10 ms of data sampling time as required to capture the 80 samples. The per-frequency times are the times required to analyze the sampled data at one frequency.

Thus, if the data is analyzed only at one frequency, as it would be using balance selection technique 0, the time required for the calibration phase would be 222 ms; for the measurement phase, it would be 227 ms. This results in a total processing time of 449 ms. For balance selection techniques 1 or 2 using five frequencies, this total time would be 1005 ms. Time from the beginning of the calibration phase to the end of the selection phase and analyzing five frequencies has been measured to be about 1.25 seconds.

There are several sources of errors inherent in the techniques used by processor 6. To help identify where and how the errors are introduced, a model of the balance selection portion of processor 6 was implemented on the PDP-11/70 computer. This model allowed the various word lengths and the data formats used in processing the sampled data to to be varied. Using this procedure, various processes performed by processor 6 were optimized.

The largest source of error was found to be introduced by the quantization error of the companded data samples. Using the computer, several sets of input data were generated that simulated the calibrate and measurement data as would be received by processor 6 in a balance selection test. This data, which represented several known impedances, was generated in both the 8-bit companded and 13-bit linear formats. Using the computer model of processor 6 to analyze the sets of 8-bit companded data, the calculated impedance values were found to be in error by an rms (root mean square) value of 1.26%. However, when the sets of the 13-bit linear data were used as input, the rms error was reduced to 0.65%.

Other sources of errors include finite word lengths, effects in processing the data and inaccuracies in the 900-ohm output impedance of the SLIC (subscriber line interface circuit). The above analyses shows that the finite word length effects are in essence masked by the quantization error. The inaccuracies in the output impedance of the SLIC can be more serious. As shown in Equation 11 above, the accuracy of the calculated impedance is directly related to the accuracy of the output impedance, $Z_F$.

As shown previously, the inaccuracy in the calculated impedance values can cause wrong balance networks to be selected. This is especially true when the selection process is based on either the delta real part impedance or delta phase angle measurements.

Figure 8:
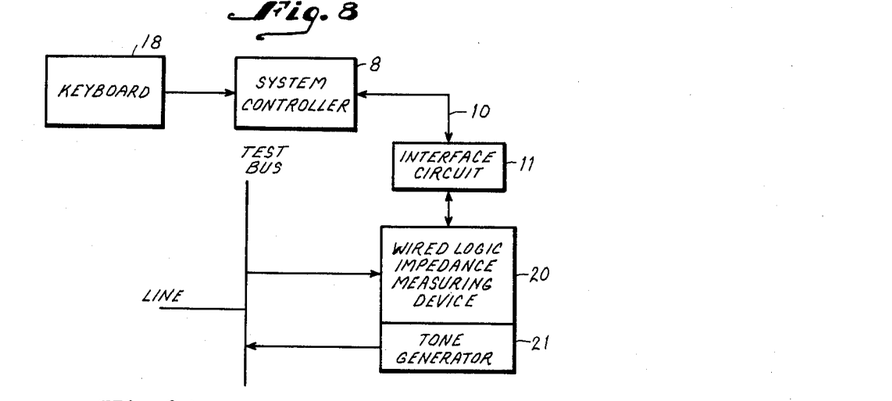
FIG. 8 is a block diagram illustrating a second embodiment of the apparatus in accordance with the principles of the present invention incorporated into a digital switching system.

The alternate test technique mentioned hereinabove to determine the appropriate balance network will now be described and is shown in FIG. 8.

Where processor 6 of the first embodiment uses the switched-PCM network and the line circuit associated with the subscriber loop under test, the second embodiment uses a wired-logic impedance measuring device 20 connected to the subscriber loop under test via the test bus.

The test device uses a SLIC to interface the subscriber loop under test, and to provide switchhook supervision, 2-to-4 wire conversion, longitudinal current rejection, and transient protection. A narrow bandpass filter centered about the test frequency provides suppression of induced 60-Hz and other interferring signals.

The wired-logic test device and processor 6 both measure group delay of the subscriber's loop impedance over a specified frequency range. Where the processor 6 method can operate on a composite multifrequency using digital signal processing techniques, the wired-logic test device 20 makes a single-frequency phase measurement, stores the phase, and increments the frequency for another phase measurement until the test frequency range is swept. If the phase differences over any 100-Hz frequency increments are less than the preset limit, this test indicates the loop is non-loaded.

To calculate group delay:
(a) N=1
(b) Set frequency=$F_N$
(c) Detect I zero crossing and V zero crossing
(d) Measure phase angle $\theta_N$ between V and I
(e) Increment frequency by 100 HZ=$F_{N+1}$
(f) Detect I zero crossing and V zero crossing
(g) Measure phase angle $\theta_{N+1}$ between V and I
(h) Subtract $\theta_N - \theta_{N+1}$
(i) If $|\theta_N - \theta_{N+1}| < \theta_{Limit}$, line is non-loaded
(j) Repeat steps e thru i until test frequency range is swept.

Figure 9A:
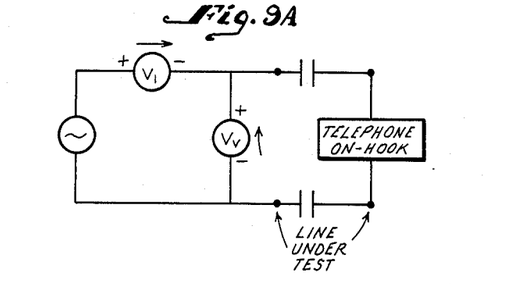
FIGS. 9A-9C are diagrams useful in explaining the theoretical operation of the apparatus of FIG. 8 in accordance with the principles on the present invention and FIG. 10 is a block diagram of one implementation of the second embodiment of FIG. 8.
Figures 9B, 9C:
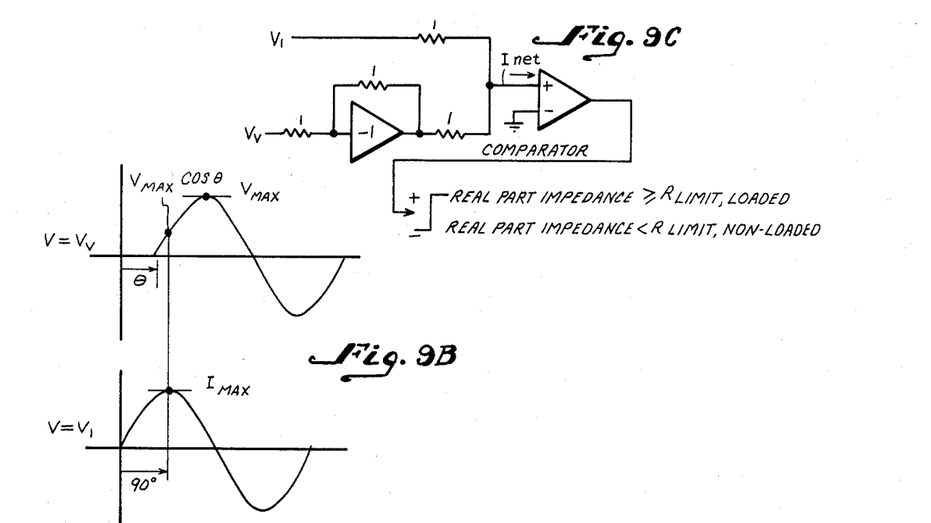

The real part impedance value is measured at 3200 Hz by measuring $V_{MAX} \cos \theta$ and $I_{MAX}$ and then performing the calculation Real Part Impedance=$(V_{MAX} \cos \theta)/I_{MAX}$, where $\theta$ is the phase difference between V and I. The value of $I_{MAX}$ is measured by first locating the I zero crossing then shifting 90°. Neither $V_{MAX}$ nor $\theta$ is measured alone. Rather, the value of V measured at the instant that $I_{MAX}$ is measured equals $V_{MAX} \cos \theta$. This is shown in FIG. 9b. The division of $V_{MAX} \cos \theta$ by $I_{MAX}$ is accomplished by the circuit shown in FIG. 9c. with FIG. 9a showing theoretically how the signals are coupled to the subscriber line under test. The limit for real part impedance is set by the value of resistors $R_I$ and $R_V$ in the comparator circuit.

To calculate Real Part Impedance:
(a) Frequency = 3200 Hz
(b) Detect I zero crossing
(c) Shift 90° and measure $I_{MAX}$ and $V_{MAX} \cos \theta$
(d) Convert $I_{MAX}$ to a current of magnitude $i_I = v_I$ (a voltage referred to $I_{MAX})/R_I$
(e) Convert $V_{MAX} \cos \theta$ into a current of magnitude $i_v = v_V$ (a voltage referenced to $V_{MAX} \cos \theta)/R_V$
(f) Invert $i_I$ to $-i_I$
(g) Sum $i_V + (-i_I) = i_{Net}$
(h) If $i_{Net} > 0$, Real Part Impedance $> R_{Limit}$ and line is non-loaded.

As shown in FIG. 8 the interface between system controller 8 and the wired-logic test device is the same as it is with the method of the first embodiment as shown in FIG. 1.

Figure 10:
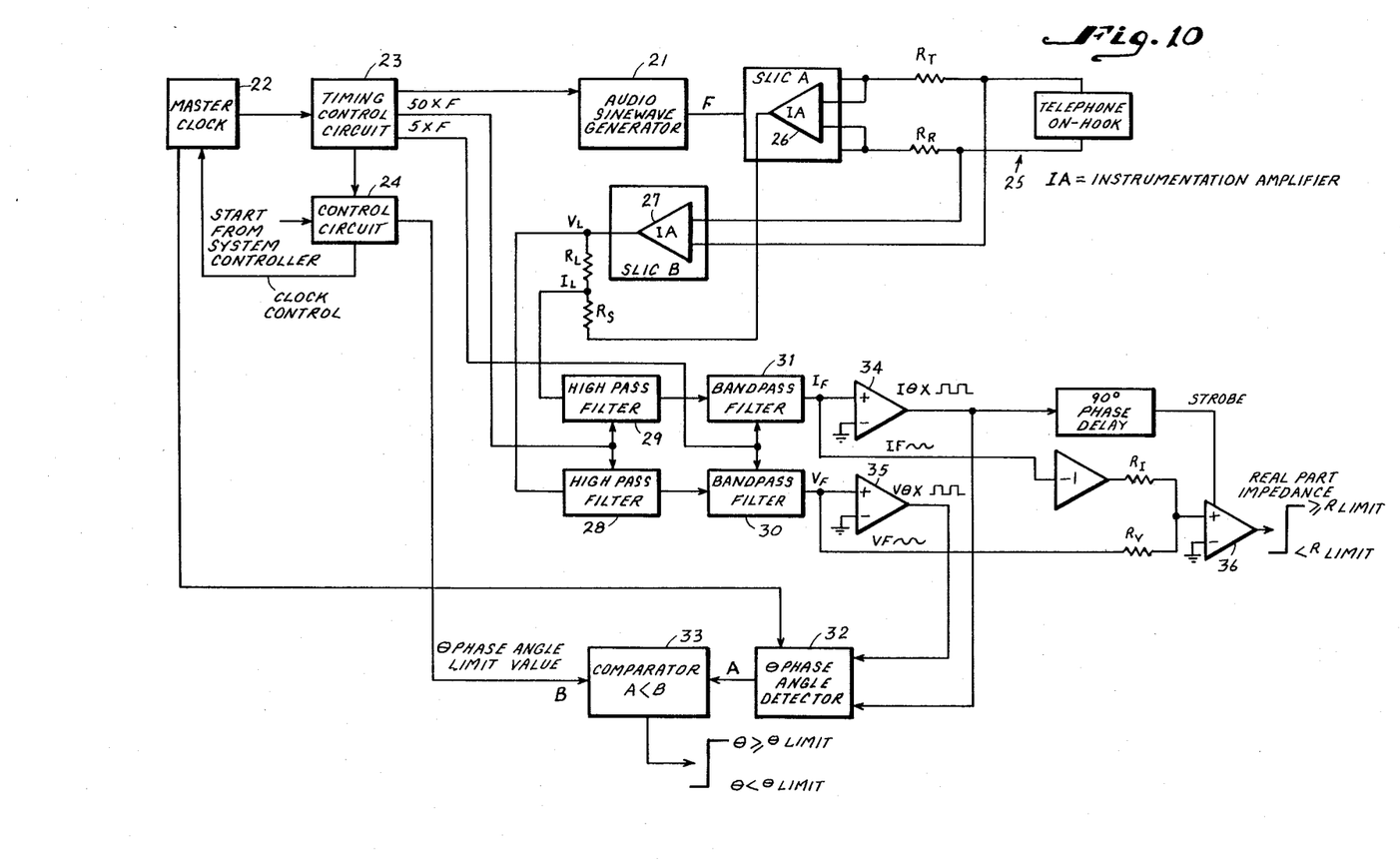

Referring to FIG. 10, the test device includes a crystal-controlled programmable low-distortion audio sinewave generator 21 controlled by a master clock 22 and timing control circuit 23. Timing control circuit 23 also controls control circuit 24 which also controls the master clock 22. Timing control circuit 23 and control circuit 24 control other components as will be mentioned hereinbelow.

Generator 21 drives the on-hook subscriber loop 25 through a SLIC A. Matched resistors $R_T$ and $R_R$ provide current sensing. The instrumentation amplifier 26 inside SLIC A detects the source voltage, $V_S$, and the instrumentation amplifier inside SLIC B detects the load voltage, $V_L$. By applying the output of amplifiers 26 and 27 to a series arrangement of resistors $R_L$ and $R_S$ a load current $I_L$ is determined by subtracting $V_S$ from $V_L$ on these resistors. Resistors $R_L$ and $R_S$ must be selected to provide an $I_L$ indication of 0 when the subscriber loop is open. The SLIC instrumentation amplifiers 26 and 27 provide a high degree of rejection of common mode loop currents and are protected against induced transients. Because there may be noise and induced 60-Hz signals on the loop, $V_L$ and $I_L$ signals are first passed through dual high-pass filters 28 and 29, respectively. High-pass filters 28 and 29 have a $-3$ dB frequency equal to F/2. The outputs of filters 28 and 29 are then passed through bandpass filters 30 and 31, respectively whose quality factor is 5. Filters 28-31 are monolithic switched-capacitor types whose clock input frequencies are provided from timing control circuit 23. Highpass filters 28 and 29 have a clock input frequency which is 50 times the $-3$ dB frequency F/2 and the bandpass filters 30 and 31 have clock frequencies applied thereto which are 5 times the center frequency F of these filters. Filtered signals $V_F$ and $I_F$ have similar phase and amplitude with respect to the unfiltered inputs $V_L$ and $I_L$ but without the interferring noise that would cause improper operation of the zero-crossing detectors and level discriminators. The $V_F$ and $I_F$ signals are then sent to detector circuits that process phase and amplitude information. The phase relationship 0 between $V_F$ and $I_F$ is measured by counting clock signals from the crystal oscillator, of master clock 22 supplied by control circuit 24 which runs at 2048 times faster than the audio sinewave of generator 21. Resolution of $2 \times 360°/2048 = 0.3520°$ is thus achieved. As the frequency is incremented, the phase difference between adjacent frequency tests gives a resolution of $2 \times 0.3520° = 0.704°$, assuming no phase errors are caused by filters 28-31. The resultant phase differences between adjacent frequencies are tested against a preset level in a digital comparator. The results of each test are sent to the interface circuit 11. These tests are performed by the phase angle detector 32 and comparator 33 with input to phase angle detector 32 being supplied from comparators 34 and 35.

The real part impedance test is performed at 3200 Hz by comparing currents developed by signal voltages $I_F$ and $V_F$ across resistors $R_I$ and $R_V$ at the summing node of a comparator. By inverting voltage $I_F$ and adding $-I_F/R_I$ to $V_F/R_V$, the current ratio is tested for polarity. Changing $R_I$ with respect to $R_V$ changes the limit against which the real part component of loop impedance is tested. The result of this test is sent to the interface circuit 11.

The audio test signal is digitally synthesized by filtering a square wave at the audio frequency with a switched-capacitor bandpass filter whose Q is greater than 10. The clock input frequency is F×50, and the unfiltered analog input is a square wave whose frequency is F.

The master clock circuit 22 consists of a group of crystal oscillators, or a crystal switching circuit and a single oscillator that runs at 3200 times the desired audio frequency.

Control circuit 24 which is under of control of system controller 8 contains the control logic to select the appropriate crystal oscillator, allow settling time for transients on the loop to diminish, and strobe the measured phase $\theta$ and real part impedance values to interface circuit 11.

Once calibration is performed at manufacture, no further adjustments are expected due to the nature of the monolithic filters providing filters 28-31 and the filters in generator 21. The National MF-10 monolithic switched-capacitor filters are dual units, and the two filters in these units are expected to behave similary with temperature variations. Both the sensed loop voltage and loop current are filtered through the dual filters, resulting in equal phase and amplitude variations. The remaining analog circuitry contains precision comparators and resistors that have very low drift rates.

An auto-calibration method can be implemented to achieve the high degree of accuracy. The test circuit can pass phase information measured in clock counts to the system processor for each test frequency with an open and short circuit, respectively, on the test device loop terminals. The system processor would then calculate the differential phase delays through the test device, which would be subtracted from measured data from the loop under test. By taking into account the differential phase delays in the test device at all test frequencies including 3200 Hz, error in measuring real part impedance is also reduced. Because computer analysis shows more allowable tolerance in the real part impedance criteria in determining whether the loop is loaded or non-loaded, no calibration beyond phase correction is required.

Considering all components used in the wired-logic test device, the component that introduces most of the measurement error is the dual bandpass filters 30 and 31. National's engineering staff has indicated a high degree of matching between the dual filters. A computer analysis of the transfer function under worst-case conditions with a 5% mismatch between dual filters on a chip introduces approximately 2° in phase error and 0.5% amplitude error. National's engineering staff believes these numbers are worse than would ever be encountered in actual devices. Adding 2° phase error tolerance to 0.704° measurement error yields 2.704° overall phase group delay error.

Real part impedance measurement error due to phase errors of 2.704° yields approximately 1.8% error, equating to 7.2 ohms out of 400 ohms. Amplitude measurement error due to other sources such as drift in the instrumentation amplifiers 26 and 27, the switched-capacitor filters, and resistors results in approximately 1% or 4 ohms out of 400 ohms. Total error in real part impedance is calculated to be 11.2 ohms out of 400 ohms or 2.75%. Real part impedance measurement could be reduced to 4 ohms out of 400 ohms or 1% by implementing auto-calibration.

A test begins by switching the loop to be tested from its associated line circuit to the wired-logic test device 20 via the test bus. Total test time, not counting ITT 1210 reaction time, is 747.7 ms for a 7-frequency test.

While we have described above the principles of our invention, in connection with specific apparatus, it is to be clearly understood that this description is made only by way of example and not as a limitation to the scope of my invention as set forth in the objects thereof and in the accompanying claims.

We claim:

1. A method to determine whether a telephone subscriber line is loaded or non-loaded comprising the steps of
   providing a signal having at least one given frequency;
   coupling said signal to a telephone subscriber line under test having a subscriber subject on-hook;
   receiving said signal from said subscriber line under test;
   and analyzing said received signal to determine the value of at least one parameter of said subscriber line under test to determine whether said subscriber line under test is loaded or non-loaded;
   wherein said step of providing a signal includes the substep of
   storing a first digital representation of a sinewave having said given frequency as said signal, and said step of coupling includes the steps of
   routing said first digital representation through a digital switching system to a digital line circuit coupled to said subscriber line under test, and
   converting said first digital representation of said sine wave to said sine wave in said line circuit for coupling to said subscriber line under test; wherein said step of receiving includes the substeps of
   converting said sine wave returned from said subscriber line under test to a second digital representation there of in said line circuit, and
   routing said second digital representation through said digital switching system prior to said step of analyzing; wherein said step of analyzing includes the substep of
   measuring the value of the real part of an on-hook impedance of said subscriber line under test to determine if said measured value is present in a given impedance window indicating a loaded condition for said subscriber line under test; wherein said step of measuring includes the substep of
   using a digital Fourier transform algorithm to obtain said measured value; wherein said digital Fourier transform algorithm is a Goertzel algorithm; and the further steps of
   passing a test sine wave of known amplitude having a predetermined frequency through said line circuit;
   determining an amplitude of said test sine wave after passing through said line circuit; and
   adjusting gain of said line circuit until said amplitude of said test sine wave after passing through said line circuit is located in a predetermined amplitude window.

2. A method according to claim 1, further including the steps of
   passing a test sine wave of known amplitude having a predetermined frequency through a gain control circuit associated with said subscriber line under test;
   determining an amplitude of said test sine wave after passing through said control circuit; and
   adjusting gain of said control circuit until said amplitude of said test sine wave after passing through said control circuit is located in a predetermined amplitude window.

3. Apparatus to determine whether a telephone subscriber line is loaded or non-loaded comprising
   first means to provide a signal having at least one given frequency; second means coupled to said first means to couple said signal to a telephone subscriber line under test having a subscriber subset on-hook;
   third means coupled to said subscriber line under test to receive said signal returned from said subscriber line under test; and
   fourth means coupled to said third means to analyze said received signal to determine the value of at least one parameter of said subscriber line under test to determine whether said subscriber line under test is loaded or non-loaded;
   wherein said first means includes
   a PROM to store a first digital representation of a sine wave having said given frequency as said signal, and said second means includes
   a digital switching system coupled to said PROM to route said first digital representation to a digital line circuit coupled to said subscriber line under test, and
   a digital-to-analog converter disposed in said line circuit to convert said first digital representation to said sine wave for coupling to said subscriber line under test; wherein;
   said third means includes
   an analog-to-digital converter disposed in said line circuit to convert said sine wave returned from said subscriber line under test to a second digital representation thereof, and second digital representation being routed through said digital switching system to said fourth means and wherein
   said fourth means includes
   a microprocessor coupled to said digital switching means responsive to said second digital representation to measure the value of the real part of an on-hook impedance of said subscriber line under test and to determine if said measured value is present in a given impedance window indicating a loaded condition of said subscriber line under test.

4. Apparatus according to claim 3, wherein
   said microprocessor employs a digital Fourier transform algorithm to obtain said measured value.

5. Apparatus according to claim 4, wherein said digital Fourier transform algorithm is a Goertzel algorithm.

6. Apparatus according to claim 5, wherein said Goertzel algorithm is in the form of software for said microprocessor.

7. Apparatus according to claim 6, further including
a source of test sine wave of known amplitude having a predetermined frequency coupled to aid line circuit;
fifth means coupled to said line circuit to measure the amplitude of said test sine wave after passing through said line circuit; and
sixth means disposed in said switching system coupled to said fifth means responsive to said measured amplitude to adjust gain of said line circuit until said amplitude of said test sine wave after passing through said line circuit is located in a predetermined amplitude window.

8. Apparatus according to claim 3, further including
a source of test sine wave of known amplitude having a predetermined frequency coupled to a gain control circuit coupled to said subscriber line under test;
fifth means coupled to said control circuit to measure the amplitude of said test sine wave after passing through said control circuit; and
sixth means disposed in said switching system coupled said fifth means responsive to said measured amplitude to adjust gain of said control circuit until said amplitude of said test sine wave after passing through said control circuit is located in a predetermined amplitude window.

9. Apparatus according to claim 3, wherein said first means includes
a PROM to store a first digital representation of a plurality of sine waves each having a different given frequency as said signal, and
said second means includes
a digital switching system coupled to said PROM to route said first digital representations time sequentially to a digital line circuit coupled to said subscriber line under test, and
a digital-to-analog converter disposed in said line circuit to convert said first digital representations to said plurality of sine waves for time sequential coupling to said subscriber line under test; and
wherein said third means includes
an analog-to-digital converter disposed in said line circuit to convert said plurality of sine waves returned time ssquentially from said subscriber line under test to second digital representations thereof, said second digital representation being routed through said digital switching system to said fourth means; and
wherein said fourth means includes
a microprocessor coupled to said digital switching system responsive to each of said second digital representations in time sequence to measure the value of the change in the real part of an on-hook impedance of said subscriber line under test for each of said different given frequencies and to determine for each of said different frequencies if said measured values are present in a given impedance window indicating a loaded condition of said subscriber line under test.

10. Apparatus according to claim 9, wherein p1 said microprocessor employs a digital Fourier transform algorithm to obtain said measured values.

11. Apparatus according to claim 10, wherein said digital Fourier tranforms algorithm is a Goertzel algorithm.

12. Apparatus according to claim 11, wherein said Goertzel algorithm is in the form of software for said microprocessor.

13. Apparatus according to claim 12, further including
a source of test sine wave of known amplitude having a predetermined frequency coupled to aid line circuit;
fifth means coupled to said line circuit to measure the amplitude of said test sine wave after passing through said line circuit; and
sixth means disposed in said switching system coupled to said fifth means responsive to said measured amplitude to adjust gain of said line circuit until said amplitude of said test sine wave after passing through said line circuit is located in a predetermined amplitude window.

14. Apparatus according to claim 9, wherein said fourth means includes
a microprocessor coupled to said digital switching system responsive to each of said second digital representations in time sequence to measure the value of the change in phase angle of an on-hook impedance of said subscriber line under test for each of said different given frequencies and to determine for each of said different given frequencies if said measured values are present in a given change in phase angle window indicating a loaded condition for said subscriber line under test.

15. Apparatus according to claim 14, wherein said microprocessor employs a digital Fourier transform algorithm to obtain said measured values.

16. Apparatus according to claim 15, wherein said digital Fourier tranform algorithm is a Goertzel algorithm.

17. Apparatus according to claim 16, wherein said Goertzel algorithm is in the form of software for said microprocessor.

18. Apparatus according to claim 17, further including
a source of test sine wave of known amplitude having a predetermined frequency coupled to said line circuit;
fifth means coupled to said line circuit to measure the amplitude of said test sine wave after passing through said line circuit; and
sixth means disposed in said switching system coupled to said fifth means responsive to said measured amplitude to adjust gain of said line circuit until said amplitude of said test sine wave after passing through said line circuit is located in a predetermined amplitude window.

19. Apparatus according to claim 9, wherein first means include
a generator controlled by a master clock to generate a sine wave having said given frequency as said signal, and said second means includes
a first interface circuit coupled to said generator to supply said sine wave to said subscriber line under test.

20. Apparatus according to claim 19, wherein said third means includes
fifth means coupled to said subscriber line under test responsive to said sine wave returned by said subscriber line under test to produce a voltage proportional to a load voltage of said subscriber line under test and a current proportional to a load current of said subscriber line under test, high pass filter means coupled to said fifth means and said master clock clocked at a first predetermined frequency to filter said voltage and said current, and bandpass filter means coupled to said high pass filter means and said master clock clocked at a second predetermined frequency different than said first predetermined frequency to filter the outputs of said high pass filter means.

21. Apparatus according to claim 20, wherein said first predetermined frequency is equal to 50 times the −3 decibel frequency of said high pass filter means, and said second predetermined frequency is equal to 5 times the center frequency of said bandpass filter means.

22. Apparatus according to claim 20, wherein said fourth means includes inverter means coupled to said bandpass filter means to invert said filtered current, sixth means coupled to said inverter means and said bandpass filter means to combine said inverted filtered current and said filtered voltage, first comparator means coupled to said sixth means and a reference potential to provide a first output signal indicating the value of the real part of an on-hook impedance of said subscriber line under test, second comparator means coupled to said bandpass filter means and said reference potential to provide a second output signal proportional to a phase angle of said filtered current, third comparator means coupled to said bandpass filter means and said reference potential to provide a third output signal proportional to a phase angle of said filtered voltage, phase angle detector means coupled to said second and third comparator means to provide a fourth output signal proportional to a phase angle difference between said current and said voltage, and fourth comparator means coupled to said phase angle detector means and a phase angle limit value to provide a fifth output signal indicating the value of phase angle of said on-hook impedance of said subscriber line under test.

23. Apparatus according to claim 20, wherein said fourth means includes inverter means coupled to said bandpass filter means to invert said filtered current, sixth means coupled to said inverter means and said bandpass filter means to combine said inverted filtered current and said filtered voltage, and comparator means coupled to said sixth means and a reference potential to provide a first output signal indicating the value of the real part of an on-hook impedance of said subscriber line under test.

24. Apparatus according to claim 20, wherein said fourth means includes first comparator means coupled to said bandpass filter means and reference potential to provide a first output signal proportional to a phase angle of said filtered current, second comparator means coupled to said bandpass filter, means and said reference potential to provide a second output signal proportional to a phase angle of said filtered voltage, phase angle detector means coupled to said first and second comparator means to provide a third output signal proportional to a phase angle difference between said current and said voltage, and third comparator means coupled to said phase angle detector means and a phase angle limit value to provide a fourth output signal indicating the value of the phase angle of an on-hook impedance of said subscriber line under test.

* * * * *